United States Patent [19]

Fujimori et al.

[11] Patent Number: 4,849,290

[45] Date of Patent: Jul. 18, 1989

[54] ALUMINA COATED WITH DIAMOND

[75] Inventors: Naoji Fujimori; Takahiro Imai, both of Hyogo, Japan

[73] Assignee: Sumitomo Electric Industries, Ltd., Osaka, Japan

[21] Appl. No.: 84,038

[22] Filed: Aug. 11, 1987

[30] Foreign Application Priority Data

Aug. 11, 1986 [JP] Japan ................................. 61-186932

[51] Int. Cl.[4] ........................ B32B 18/00; B32B 15/00; C04B 41/00
[52] U.S. Cl. .................................. 428/408; 428/698; 428/701
[58] Field of Search ................ 428/408, 698, 699, 701

[56] References Cited

U.S. PATENT DOCUMENTS 4,396,677 8/1983 Intrater et al. ...................... 428/408
4,734,339 3/1988 Schachner et al. ............. 428/698 X

FOREIGN PATENT DOCUMENTS 0166708 1/1986 European Pat. Off. .
3522583 2/1986 Fed. Rep. of Germany .

Primary Examiner—Nancy A. B. Swisher
Attorney, Agent, or Firm—Cushman, Darby & Cushman

[57] ABSTRACT

Alumina coated with diamond comprises an alumina substrate, a silicon carbide film formed on the alumina substrate, and a diamond film formed on the silicon carbide film.

3 Claims, 3 Drawing Sheets

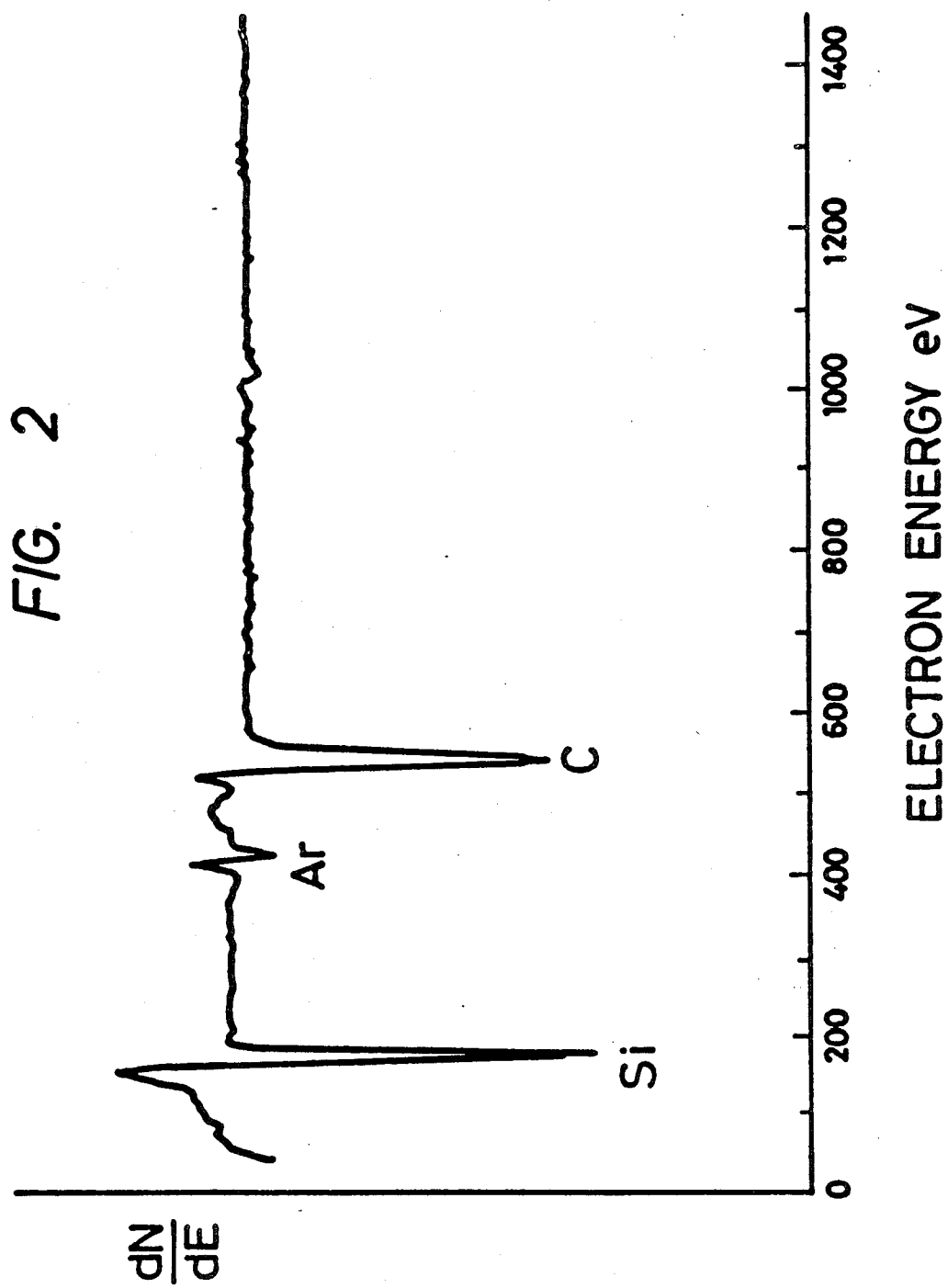

ALUMINA COATED WITH DIAMOND

BACKGROUND OF THE INVENTION

The present invention relates to alumina with its surface coated with diamond by means of vapor-phase growth methods. The thus coated alumina is usable for a cutting tool, a vibration plate of a speaker, a wear resistance part, etc., and further usable for an IC substrate, etc. since the diamond itself has very high hardness and a low dielectric constant and high thermal conductivity.

As is well known, a diamond is a crystal of carbon (C). Graphite has a stable crystal structure of C under atmosphere-pressure, and the crystal structure of a diamond is in an energy state higher than that of graphite. Generally, C-atoms provide a stable crystal structure as graphite under the condition of low pressure while as diamond under the condition of high pressure.

Some energy must be supplied to transform graphite into diamond. As means for supplying energy to the graphite, required is a condition of high temperature and high pressure at least 1,450° C. and 55,000 atoms.

Further, it is general to use a catalyst so as to accelerate the transformation of graphite into diamond, and a metal alloy such as nickel (Ni) or cobalt (Co) has been used as the catalyst.

Nowadays, diamonds for industrial use have been produced by means of superhigh pressure as described above, and many of the thus obtained diamonds have been embedded in bits of lathes, in tip ends of drills, and the like, so as to be used as cutting tools.

Generally, it has been a common sense that superhigh pressure and a high temperature are indispensable for synthesizing diamond. However, recently, it has become possible to synthesize diamond thin films from gasses under low pressure and low temperature by means of a chemical vapor phase growth method or the like, that is, a CVD (Chemical Vapor Deposition) method, in which a gas is decomposed to grow a solid, without using superhigh pressure, and it is considered that such diamond thin flims are applicable to various technical fields.

Conventionally, the condition for forming a diamond film with good crystallinity by means of a CVD method is such that a hydrocarbon gas diluted with a hydrogen gas having a volume of more than ten times as large as that of the former is excited by plasma or a heated tungsten filament and a substrate is heated to about 700°–1,000° C., as described in Japanese Patent Application Laid-Open Nos. 135117/83, 110494/83 and 3098/84, etc.

If a diamond film is formed on a surface of a metal material, it is possible to increase the wear resistance of the material and to reduce a friction coefficient of the same. Since the temperature for synthesizing a diamond film by means of the abovementioned CVD method is generally higher than 700° C., there is such a problem that materials for substrate on which diamond films are formed are limited. On the other hand, if a diamond film is formed, for example, on a ceramic material, it is possible to give properties such as improved wear resistance and improved corrosion resistance to the substrates material, which have never been provided to it.

In the prior art references disclosing such CVD methods for synthesizing diamond films, Japanese Patent Application Laid-Open No. 106478/86 is relevant to the present application. This prior art discloses a product coated with diamond, which consists of a substrate of ceramic sintered body, a first layer of carbide, nitride, oxide, boride, etc. of periodic table 4a, 5a or 6a group metals on the substrate and a second layer of silicon nitride, silicon carbide, etc., on the first layer, and further coated diamond and/or diamond-like carbon on the second layer. Also, Japanese Patent Application Laid-Open No. 161897/86 discloses a vibrator of a speaker consisted of an alumina layer directly coated with diamond or diamond-like carbon.

However, if a surface of alumina is coated simply with a diamond film by means of the above-mentioned CVD method, the diamond film is apt to peel off so that no useful diamond coating has been realized. It is considered that such peeling is caused by a high synthesizing temperature (generally, more than 700° C.) of the diamond film which generates thermal distortion and large residual stress in the film.

The above mentioned Japanese Patent Application Laid-Open No. 106478/86 discloses a variety of ceramic sintered materials provided with first and second layers and further diamond coating layer. Although it is certain that the coating layers of such a structure are useful, the more the number of the layer is, the more the number of manufacturing steps is. Accordingly, the thus obtained product becomes expensive. Furthermore, when plural coating layers are formed, thickness of each coating layer other than a diamond film becomes thick so that the effects of diamond itself are decreased.

SUMMARY OF THE INVENTION

An object of the present invention is fo provide such alumina coated with diamond that a diamond film coated on the surface of alumina does not peel off.

Also, the object of the present invention is to provide an alumina coated with diamond having a higher peeling strength than that of the vibration plate of the speaker composed of an alumina layer directly coated with diamond as disclosed in the above-mentioned Japanese Patent Application Laid-Open No. 161897/86.

Carrying out various experiments in order to attain the above-mentioned object of the invention, the present inventors have thought of the following ideas. That is, synthesizing of a diamond film is carried out in a reducing atmosphere and therefore when a diamond is formed on alumina ($Al_2O_3$), diamond generation nuclei are formed on an extremely unstable surface of the alumina. Accordingly, it is considered that a diamond film formed by means of the above-mentioned CVD method would be attached on a surface of an alumina aterial with an extremely weak bonding force. Accordingly, the problem may be solved if a diamond film is formed on a surface of an alumina material through an intermediate layer which would not be damaged in a reducing atmosphere or would be damaged little to such a degree that the damage would not affect the bonding strength if any damage is caused. Based on the ideas, the present inventors could achieve the present invention.

That is, the present invention has a feature in that the surface of alumina is coated with diamond through an SiC film interposed therebetween.

BRIEF DESCRIPTION OF THE DRAWINGS

FIG. 2 is a graph showing Auger spectrum.

DETAILED DESCRIPTION OF THE PREFERRED EMBODIMENTS

An SiC film to be formed on an alumina material may be crystalline or amorphous. However, an amorphous film is preferable to a crystalline film since the property and the thickness of the amorphous film are more uniform. Also, the density of nuclei generated at the early step of forming diamond is higher in amorphous films so that the thus obtained diamond film becomes superior.

The thickness of an SiC film is 0.1–30 $\mu$m, more preferably 0.2–5 $\mu$m. In view of the relaxation of thermal stress between a substrate and a diamond film and the increase of adhesion between the both, it is preferable that the thickness of SiC film is thick However, since SiC is softer than diamond, it is preferable that the SiC film is thin so that the hardness of diamond can be usable. Also, if the SiC film is thick, the coating step of the film requires a long time so that the thickness of SiC film is preferably 0.2–5 $\mu$m. When a crystalline SiC film is used, it is preferable that the crystal grain size is 5 $\mu$m or less, more preferably 1 $\mu$m or less. Since, if the crystal grain size becomes large, it is hard to keep the uniformity of the surface.

A diamond film to be formed on a SiC film should be constituted of a crystalline one. The thickness of the diamond film is preferably 0.5–30 $\mu$m. If the thickness is more than 30 $\mu$m, cracks are apt to occur in the film and the coating step of the film requires a long time so that it is not preferable. If the thickness is less than 0.5 $\mu$m, the effect of the diamond coating is small. Accordingly, it is preferable that the thickness of diamond film is within the range of 1–10 $\mu$m.

As described above, after a surface of alumina has been coated with an SiC film, a diamond film is synthesized on the surface of the SiC film through the vapor-phase growth method. Accordingly even if the diamond is synthesized by means of the CVD method in a reducing atmosphere, the diamond film is formed on the surface of the alumina without being affected by the reducing atmosphere.

Generally, vapor-phase synthesis of diamond is carried out in a reducing atmosphere. Accordingly, if any vapor-phase diamond synthesis method is used, the effect according to the present invention can be obtained.

Specific examples of alumina coated with diamond according to the present invention will be described in comparison with comparative examples.

Figure 1:
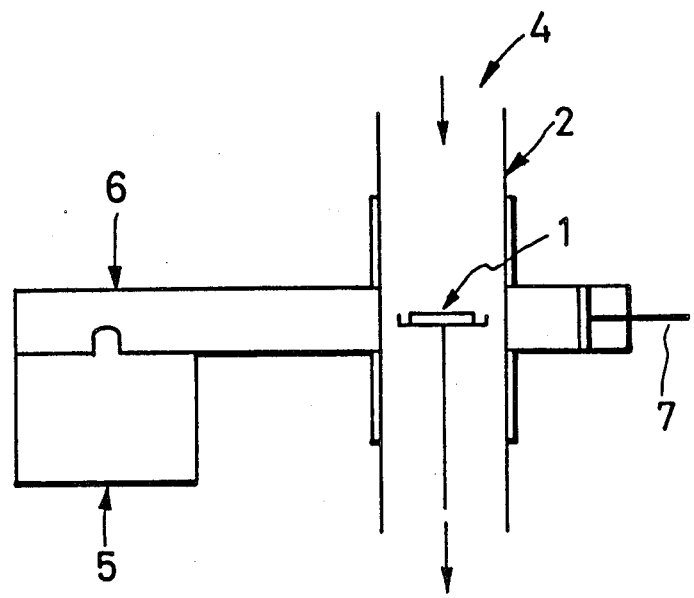
FIG. 1 is a schematic view showing a reactor for producing the alumina coated with diamond according to the present invention.

FIG. 1 shows a reactor for producing the alumina coated with diamond according to the present invention. In FIG. 1, reference numeral 1 denotes an alumina substrate; 2, a quartz tube connected to a vacuum pump (not shown); 4, a supply gas entrance; 5, magnetron; 6, a wave guide; and 7, plunger.

EXAMPLE 1

First, a sintered alumina material having a purity of 99.98% was prepared through a general HIP (Hotisostatic Press) processing, and then cut into a plate having a size of 10 mm (length)×10 mm (width)×2 mm (height). The plate was finally polished by a No. 80 diamond grind stone, and the thus obtained alumina plate was used as a substrate.

Next, a mixed gas of 10 vol % of $SiCl_4$, 10 vol % of $CH_4$ and 80 vol % of $H_2$ was introduced into the reactor through the supply gas entrance 4 and was regulated to have the pressure of 5 Torr. Then, microwave plasma was generated to heat the substrate up to 900° C. and a microwave plasma CVD was carried out for an hour. As a result, an SiC film having a thickness of 1 $\mu$m was coated on the alumina substrate.

The thus obtained alumina substrate coated with the SiC film was again placed in the reactor shown in FIG. 1 and a mixed gas of 1 vol % of $CH_4$ and the remainder of $H_2$ was introduced and was regulated to have the pressure of 50 Torr. Next, microwave plasma was generated to heat the alumina substrate coated with the SiC film up to 900° C. The microwave plasma CVD was carried out for 2 hours. As a result, a diamond film having a thickness of 3 $\mu$m was formed on the SiC film.

After finishing a plasma discharge, the SiC film and the diamond film formed by means of the abovementioned plasma CVD were tested. In the SiC film, no peak was detected by means of X-ray diffraction, while it was ascertained that the SiC film had a coupling of SiC and being amorphous by means of electron spectroscopy for chemical analysis (ESCA) and Auger electron spectroscopy.

Figure 3:
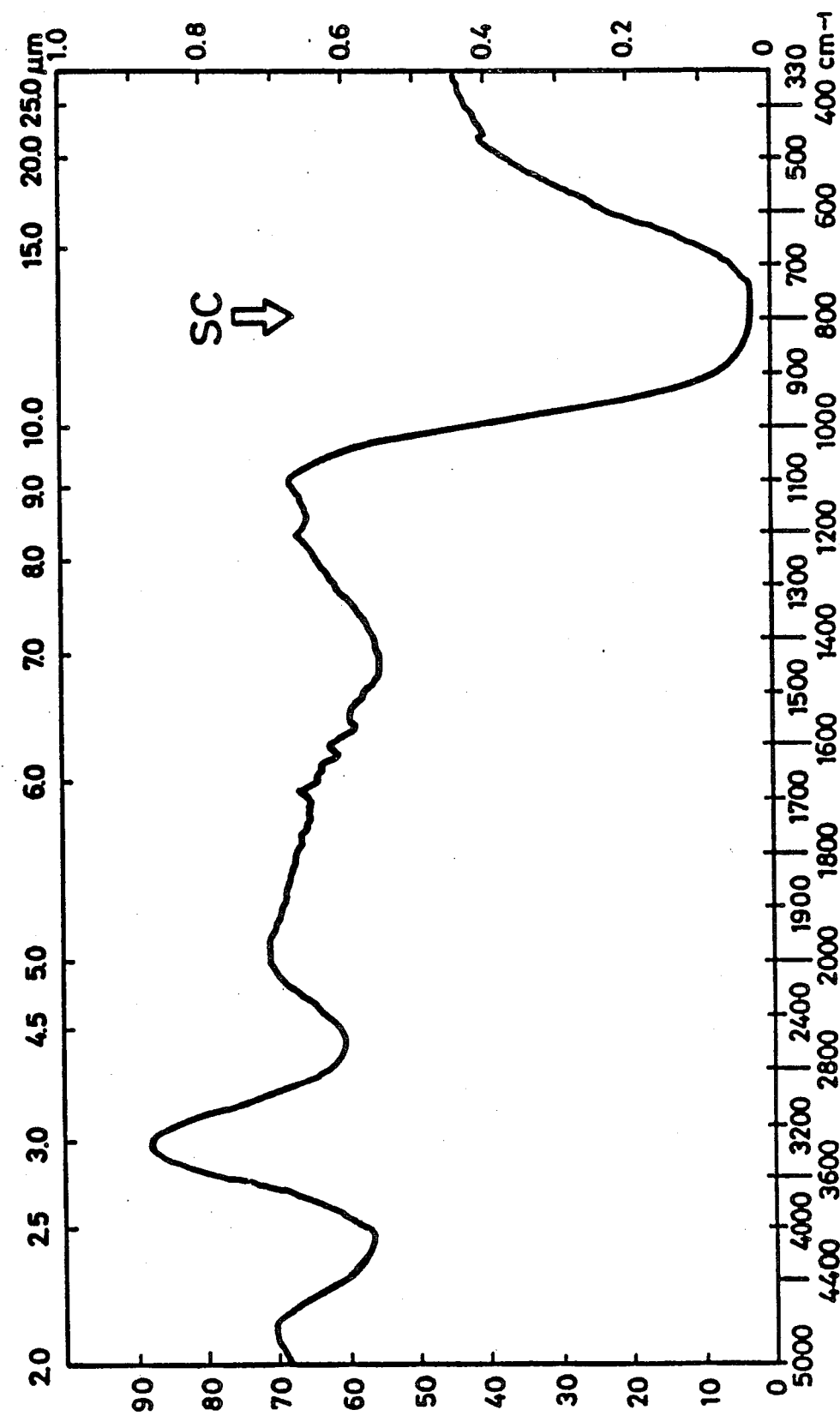
FIG. 3 is a graph showing infrared absorption spectrum.

FIG. 2 shows Auger spectrum and FIG. 3 shows infrared absorption spectrum. Although the bonding of SiC was not detected by the X-ray diffraction, the formation of SiC was apparent from the results shown in FIGS. 2 and 3.

In the diamond film, on the other hand, peaks were observed by means of X-ray diffraction, so that it could be ascertained that the diamond film was mainly composed of crystalline diamond.

In the foregoing example, the description was made as to the amorphous SiC film covering the surface of the alumina substrate. However, it was ascertained that the same result as that in the amorphous SiC film could be obtained even when the SiC film was crystalline.

EXAMPLE 2

An SiC film and a diamond film were coated on an alumina substrate having a purity of 99.5% or more and a size of 30 mm (length)×30 mm (width)×5 mm (height) by means of the same method as that of Example 1. The properties of the thus obtained alumina coated with diamond are shown in Table 1.

Figure 4:
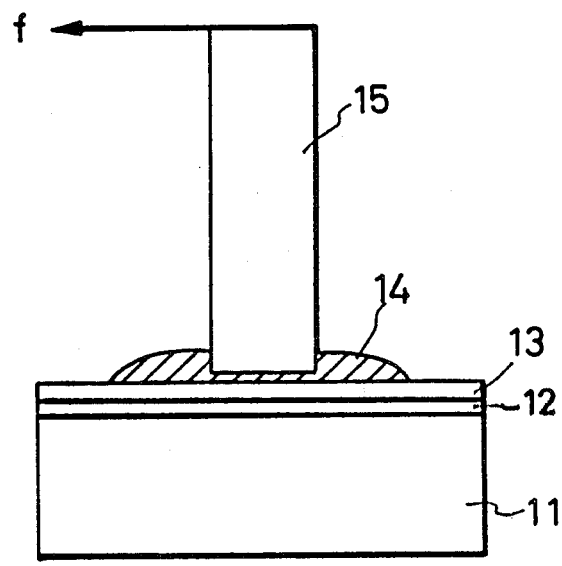
FIG. 4 is a schematic view showing the way of peeling test.

The thus obtained alumina coated with diamond was tested as to the peeling strength. That is, as shown in FIG. 4, a metal rod 15 of 10$\Phi$×100 mm (l) was adhered the diamond film 13, which was coated on the alumina substrate 11 through the SiC film 12, by epoxy resin 14 and then transverse force f was applied to the rod to pull down it. Table 1 shows the force at which the diamond film 13 peeled off. "No peeling" in Table 1 means that the diamond film did not peel off but the peeling occurred between the epoxy resin 14 and the metal rod 15 or between the epoxy resin 14 and the diamond film 13.

TABLE 1

| | Intermediate layer | | Diamond film | Peeling |
|---|---|---|---|---|
| | material | film thickness ($\mu$m) | film thickness ($\mu$m) | force f (Kgf) |
| Comparative Examples | — | — | 1 | 7.0 |
| | — | — | 3 | 1.5 |
| Example | SiC/(amorphous) | 0.05 | 3 | 1.6 |
| | SiC/(amorphous) | 0.2 | 3 | 12.0 |
| | SiC/(amorphous) | 0.5 | 3 | no peeling |
| | SiC/(amorphous) | 2.0 | 3 | no peeling |
| | SiC/(amorphous) | 2.0 | 10 | 15.0 |
| | SiC/(amorphous) | 10.0 | 3 | 18.0 |
| | SiC/(crystalline) | 0.5 | 3 | 8.0 |
| | SiC/(crystalline) | 2.0 | 3 | 16.0 |
| Comparative Examples | TiC | 2.0 | 3 | 2.0 |
| | Si$_c$N$_4$ | 2.0 | 3 | 7.0 |
| | TiN | 2.0 | 3 | 1.5 |

EXAMPLE 3

An SiC film of 1 $\mu$m thickness and a diamond film of 3 $\mu$m thickness are successively coated on an alumina plate having a purity of 99.5% or more and a size of 10 mm (length)×40 mm (width)×30 $\mu$m (length) by means of the same method as that of example 1. The thus obtained alumina coated with diamond was fixed at its end and a resonance frequency was measured. Acoustic velocity was 9,400 m/sec for an alumina without diamond film while it was 11,000 m/sec for an alumina coated with diamond, which was higher by about 20 percent.

EXAMPLE 4

Cutting tools (Model No. SNGN 120408) comprising substrate materials W-80 (made by Sumitomo Electric Industries, Ltd.) composed of alumina added with MgO, NiO, etc., and B-90 (made by Sumitomo Electric Industries, Ltd.) composed of alumina added with TiC, were prepared. Various cutting tools composed of alumina coated with diamond as shown in Table 2 were prepared by means of the following methods. The conditions for each film are as follows:

$CH_4 : H_2 = 1:50$,
substrate temperature: 930° C.,
tungsten filament CVD method using a tungsten filament was used,
the distance between the filament and the substrate: 10 mm, and
the temperature of the filament: 2,250° C.

[Amorphous SiC film]
The conditions are the same as those of Example 1.

[Crystalline SiC film]
Thermal CVD method was used,
$C_3H_8 : SiCl_4 : H_2 = 5:1:50$, and
substrate temperature: 1,250° C.

[TiC film]
Thermal CVD method was used,
$CH_4 : TiCl_4 : H_2 = 3:1:30$, and
substrate temperature: 1,050° C.

[Si$_3$N$_4$ film]
Plasma CVD method was used,
$NH_4 : SiCl_4 : H_2 = 1:4:40$,
substrate temperature: 900° C.,
frequency of generated plasma: 13.56 MHz, and
applied power: 300 W.

[TiN film]
Plasma CVD method was used,
$N_2 : TiCl_4 : H_2 = 5:1:20$,
substrate temperature: 700° C.,
frequency of generated plasma: 13.56 MHz, and
applied power: 200 W.

The thus obtained cutting tools composed of alumina coated with diamond were tested under the following conditions:

| | |
|---|---|
| material to be cut: | 12% Si—Al alloy, |
| cutting speed: | 300 m/min, |
| feed: | 0.1 mm/rev, and |
| depth of cut: | 0.2 mm. |

The results are shown in Table 2.

TABLE 2

| Substrate Material | Intermediate layer | | Diamond film | Cutting time required for making the wear amount of flank 0.1 mm |
|---|---|---|---|---|
| | Material | film thickness ($\mu$m) | film thickness ($\mu$m) | |
| Comparative Examples | W-80 | — | — | — | 10 minutes |
| | W-80 | — | — | 1 | peeled off in one minute |
| | W-80 | — | — | 3 | peeled off in 15 seconds |
| Examples | W-80 | SiC(amorphous) | 0.1 | 3 | 25 minutes |
| | W-80 | " | 0.5 | 1 | 50 minutes |
| | W-80 | " | 0.5 | 3 | 140 minutes |
| | W-80 | " | 0.5 | 10 | peeled off in 35 minutes |
| | W-80 | SiC(crystalline) | 1.0 | 3 | 55 minutes |
| | B-90 | SiC(amorphous) | 25 | 25 | peeled off in 10 minutes |
| | B-90 | SiC(amorphous) | 15 | 5 | peeled off in 15 minutes |
| | B-90 | SiC(amorphous) | 2 | 25 | peeled off in 10 minutes |
| Comparative Examples | B-90 | TiC | 0.5 | 4 | peeled off in 3 minutes |
| | B-90 | Si$_3$N$_4$ | 1.5 | 3 | peeled off in 12 minutes |
| | B-80 | TiN | 1.0 | 5 | peeled off in 1.5 minutes |

Furthermore, as a comparative example, alumina coated with diamond was formed in the same method as in the foregoing example 1 of the present invention except that a diamond film was synthesized directly on a surface of an alumina substrate by means of a plasma discharge without coating the surface of the alumina substrate with an SiC film.

Next, characteristics of the samples (diamond coated alumina) prepared according to the above-mentioned example 1 and the comparative example were tested after leaving them for a long time. The result of test proved that no change was recognized in the diamond film of the sample prepared in accordance with the method of the foregoing example 1 even after the sample had been left for one year. On the other hand, about 40% of the diamond film peeled off when the sample according to the comparative example had been left for only one day.

As is apparent from the foregoing description, the alumina coated with diamond according to the present invention in which a diamond film is formed on a surface on an alumina material through an SiC film interposed therebetween has various advantages as follows.

(1) Compared with the alumina coated with diamond in which a diamond film is formed directly on a surface of an alumina material, the alumina coated with diamond according to the present invention is extremely superior in wear resistance because the diamond film rarely peels off.

(2) A diamond film which hardly peels off can be formed on an alumina substrate only by interposing an SiC layer even if the alumina substrate has a complicated shape in accordance with the purpose of use.

(3) The alumina coated with diamond according to the present invention can be applied to a field requiring wear resistance as an alumina plate having a property of diamond, such as a cutting tool, a mechanical seal, and so on, to a field requiring low dielectric constant as an IC substrate in which a high frequency current flows, and to a field requiring a high specific modulus of elasticity as a vibration plate of a speaker, and so on.

What is claimed is:

1. Alumina coated with diamond, comprising an alumina substrate, an amorphous silicon carbide film disposed on said alumina substrate, and a diamond film disposed on said silicon carbide film.

2. Alumina coated with diamond as claimed in claim 1, wherein said silicon carbide film has thickness of 0.1–30 $\mu$m.

3. Alumina coated with diamond as claimed in claim 1,
   wherein said diamond film has thickness of 0.5–30 $\mu$m.

* * * * *